United States Patent [19]
Vorel

[11] 3,807,187
[45] Apr. 30, 1974

[54] HOOD AND METHOD FOR GENERATING CARBON DIOXIDE SNOW

[75] Inventor: Charles J. Vorel, Elmhurst, Ill.

[73] Assignee: Chemetron Corporation, Chicago, Ill.

[22] Filed: Apr. 5, 1973

[21] Appl. No.: 348,041

[52] U.S. Cl. .................. 62/76, 62/56, 62/387, 62/388, 62/10, 62/63, 62/384, 62/78
[51] Int. Cl. ............................................. F25c 1/24
[58] Field of Search ........ 62/56, 76, 165, 168, 384, 62/387, 388, 78

[56] References Cited
UNITED STATES PATENTS

| | | | |
|---|---|---|---|
| 1,933,257 | 10/1933 | Goosman | 62/388;78 |
| 3,109,296 | 11/1963 | Williamson | 62/388 |
| 3,163,022 | 12/1964 | Hottenroth | 62/388 |
| 3,214,928 | 11/1965 | Oberdorfer | 62/384 |
| 3,435,632 | 4/1969 | Fallen | 62/384 |
| 3,475,918 | 11/1969 | Burton | 62/384 |
| 2,483,064 | 9/1949 | Ruch | 62/78 |

Primary Examiner—William J. Wye
Attorney, Agent, or Firm—N. M. Esser

[57] ABSTRACT

An apparatus and method are provided wherein carbon dioxide gas, separated by centrifugal force from dry ice, is discharged up a stack at a velocity such that it aspirates $CO_2$ vapor from a snow hood, including that developed by a conventional snow horn, and exhausts it from the area.

10 Claims, 2 Drawing Figures

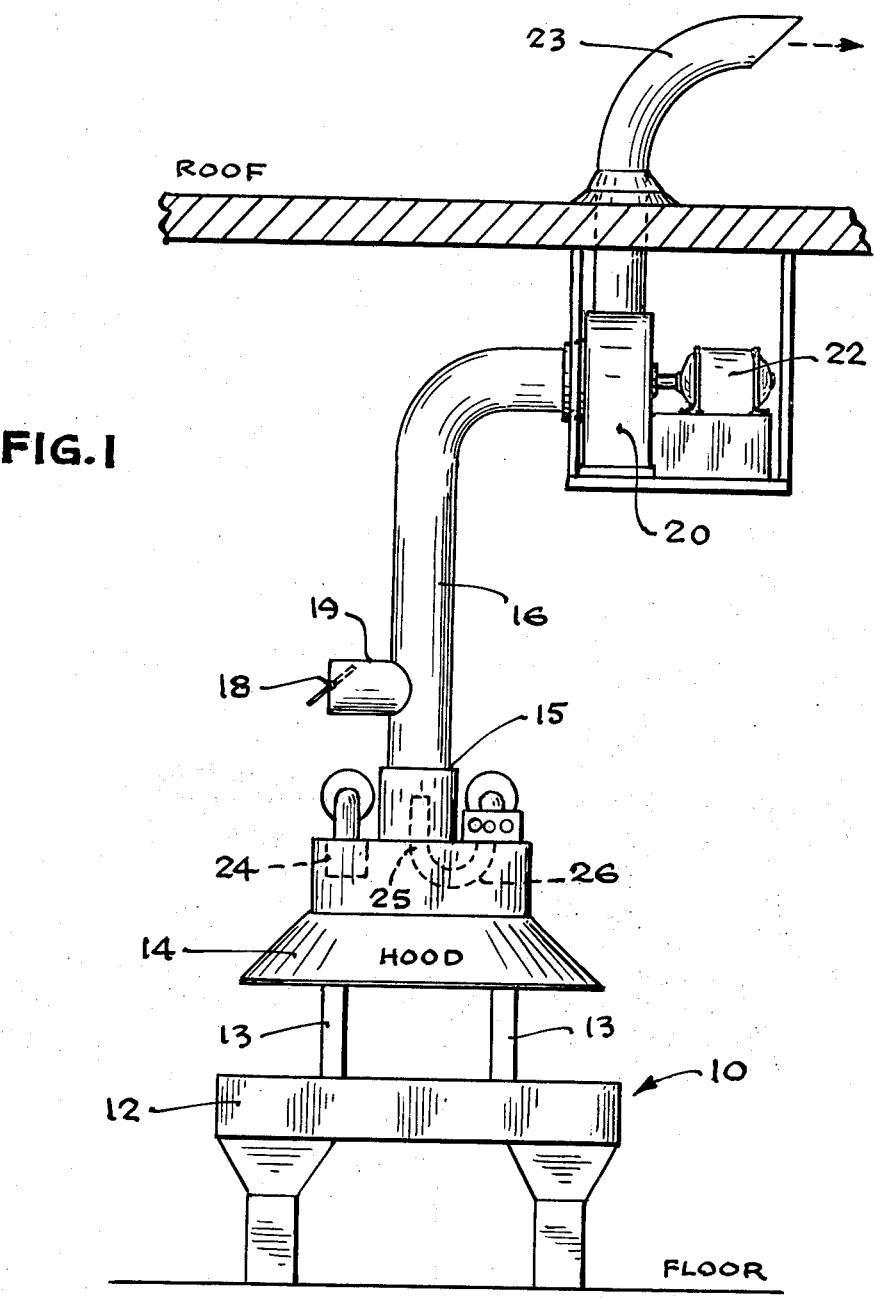

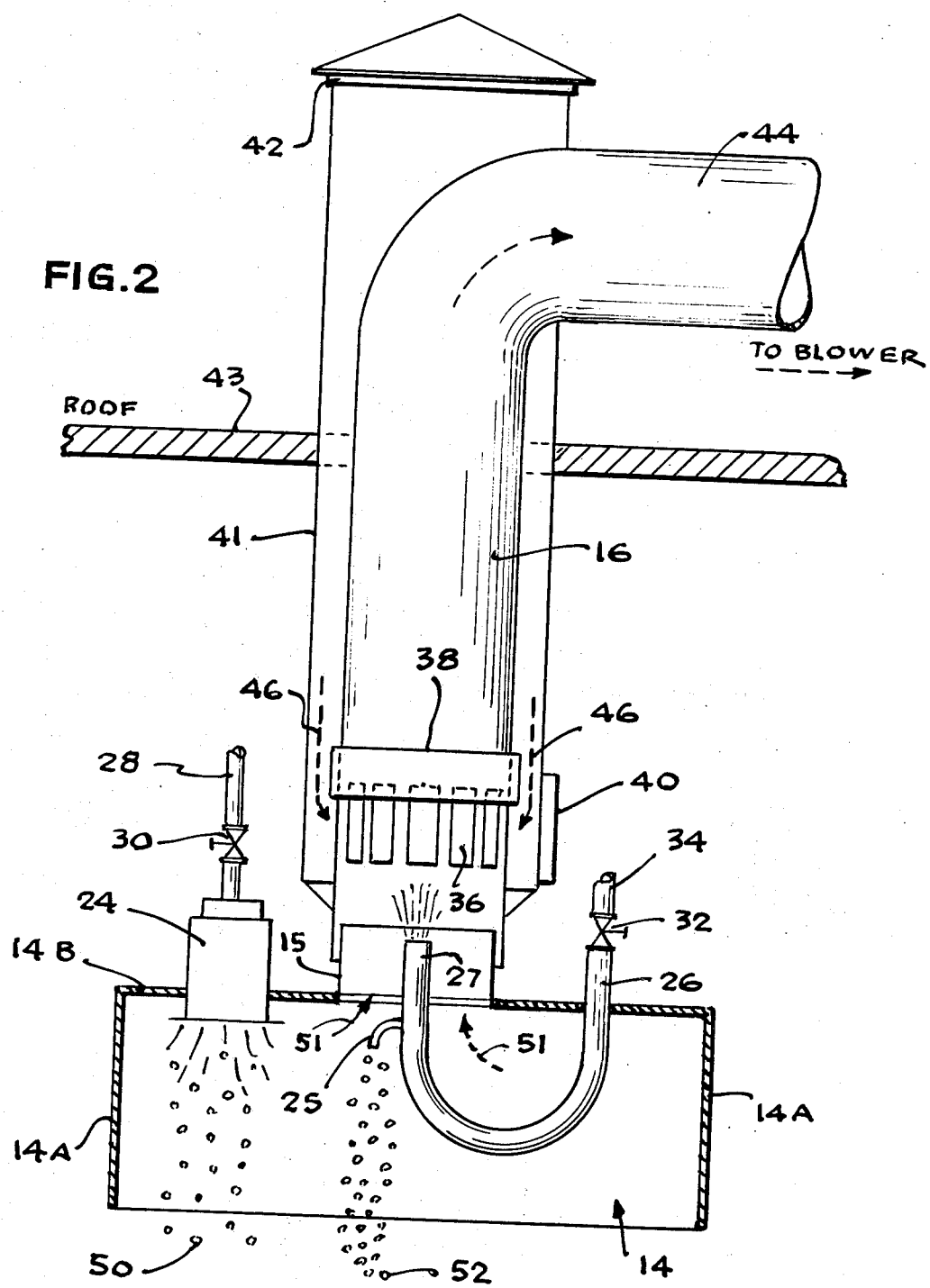

HOOD AND METHOD FOR GENERATING CARBON DIOXIDE SNOW

BACKGROUND OF THE INVENTION

Carbon dioxide, as dry ice, has many applications in food processing. In packing poultry it has an advantage in that the dry ice snow causes a "crust freeze" on the birds which seals in flavor and moisture without deep freezing which is unacceptable for a fresh poultry product. After the dry ice sublimes to gas, the poultry is delivered dry, eliminating messy handling. Bacteria growth is also reduced and substantial savings in transportation costs over poultry frozen with water ice have been demonstrated.

For each four pounds of dry ice snow, four to seven pounds of carbon dioxide gas also are generated. At ordinary rates for packing chickens, from 100 to 250 cubic feet of carbon dioxide gas are generated per minute. This gas is non-toxic but does have physiological effects so that it must be vented out of the building.

THE INVENTION

The snow hood and method of generating carbon dioxide snow of this invention separate snow from vapor internally and remove a substantial amount of vapor before the snow is discharged onto the product to be chilled. Provisions are made to aspirate a large amount of gas from the work area and to regulate this amount.

The hood comprises an enclosure within which a conventional horn such as that shown in U. S. Pat. No. 2,978,187 converts liquid carbon dioxide into snow and gas. Adjacent the horn is a second converter in the form of a J tube bent so that centrifugal force separates the snow from the vapor and the vapor is discharged with considerable velocity. This apparatus is described in Patent Application Ser. No. 113,489 filed Feb. 8, 1971. By directing the discharge from the J tube up a stack, all of its carbon dioxide vapor is removed from the area. Additionally, the great velocity of the vapor stream aspirates all of the vapor from the standard horn and even some room air. The degree of aspiration is controlled with a damper which admits a regulated amount of air into the stack. An auxiliary exhaust means such as a fan in the stack may also be provided to insure discharge of carbon dioxide gas remaining in the stack when operation of the J tube is interrupted, carbon dioxide gas being so heavy that it may settle out of the vent system unless some means is provided for discharge when the aspiration ceases.

The invention contemplates apparatus for generating carbon dioxide snow with a reduced carbon dioxide vapor content comprising a hood open on the bottom and having an enclosing side wall and top with a substantially vertical vent means having its inlet in said top. A horn to convert liquid carbon dioxide into carbon dioxide snow and carbon dioxide vapor is within the hood and adjacent to the vent. Jet means directs a high velocity stream of carbon dioxide vapor up said vent at said inlet which action may be aided by suction means in said vent and modulated by damper means in said vent, preferably near its inlet.

In one embodiment the jet means comprises a tube to generate snow from liquid $CO_2$ and to separate the $CO_2$ vapor by centrifugal force for discharge as a high velocity stream. In a preferred embodiment the jet discharge is adjacent said inlet to said vent. The suction means in the stack may be a fan or blower.

The method of operation wherein liquid $CO_2$ is converted into $CO_2$ snow with disposition of the resulting $CO_2$ vapor comprises the steps of converting a first stream of liquid $CO_2$ into vapor and snow having a low velocity at a first location, separating the snow from the vapor substantially by gravity, converting a second stream of liquid $CO_2$ into vapor and snow at a second location adjacent said first location, separating the vapor from the snow by centrifugal force, and discharging the vapor from said second stream into a vent adjacent said first snow generator to aspirate the vapor from the first location into the vent. In a preferred embodiment, the low velocity snow is delivered in a downward direction.

The invention will be better understood by reference to the drawings and from the following description which is intended to be illustrative only and not limiting.

FIG. 1 shows the general arrangements of the elements of the apparatus of the invention in a somewhat diagramatic representation, and FIG. 2 is a larger view, partly in section, to show the internal structure of the hood in greater detail.

In FIG. 1, a conveyor work station is indicated generally by the numeral 10 and includes a table 12 to receive the product to be chilled with dry ice snow. Tubular extensible mounts 13 support a stainless steel sheet hood 14 fitted with a vent 15. From the vent 15 extends a stack 16 having a damper 18 in a tee 19. The stack 16 leads to a blower 20 driven by a motor 22 to force vapors out the exhaust 23. Shown in dotted lines within the hood are a horn 24 and a J tube 26 from which projects a scoop 25. The horn, J tube and vent are all located in close proximity in the top of the hood.

The snow generating elements are further illustrated in FIG. 2 along with an alternate embodiment of the stack and damper structure. The hood 14, comprising walls 14A and top 14B is fitted with a horn 24 and a J tube 26. In some installations it may be desirable to employ a plurality of horns and J tubes which, of course, vary in size according to their capacity to generate snow. The discharge end 27 of the J tube is located within the vent 15 and is directed upward parallel, or substantially so, to the axis of the stack 16. Liquid carbon dioxide is supplied to horn 24 from a storage tank through feed line 28 and valve 30. Similarly, the J tube 26 receives liquid carbon dioxide via feed line 34 and valve 32.

The stack 16 has near its lower end a plurality of slots 36 the open area of which are regulated by sleeve 38 which is adjusted through door 40. Surrounding stack 16 is pipe 41 which has at its top intake 42 located above the roof indicated by number 43. The stack outlet 44 likewise is above the roof.

When gas is discharged from the end 27 of the J tube, a low pressure area is created in the vicinity of the slots 36. Air from the outside enters at the top 42 of the pipe 41 and flows down and into the slots as indicated by arrows 46. The sleeve 38 is adjusted so that vapor is drawn up the stack as indicated by arrows 51, but the snow falls into the boxes of product.

The operation of the device is further explained by reference to packing chickens but this explanation is to be understood as illustrative only.

The snow separator hood deposits a predetermined amount of carbon dioxide snow into a box containing 65 pounds of whole dressed chickens moving along its conveyor to a spot from about 5 to about 16 inches under the hood. Normally the snow separator hood is installed in a processing line with a conveyor leading up to and away from the snow separator hood so that it becomes an integral part of that line. Controls may be set such that each box placed under the hood receives a timed discharge of snow. About 4 pounds of dry ice snow are delivered to each box, and about eight boxes are processed per minute.

In operation, a horn and a J tube in a hood about 46 inches long, 22 inches wide and 12 inches high are fed liquid carbon dioxide at about 300 psig at a rate of about 65 to about 90 pounds per minute to generate about 32 pounds per minute of dry ice snow. The snow from the horn, indicated at 50 is preferably directed downward from the horn and separates by gravity from the concomitently generated vapor shown by arrow 51. In the J tube liquid carbon dioxide expands through an orifice to form a mixture of snow and vapor. They are separated in the J tube by centrifugal force. Near the end of the J tube an adjustable scoop 25 deflects the snow downward, while the vapor continues upward to discharge at high velocity into the vent.

The snow from the horn and J tube are deposited on the product where some of it sublimes to form vapors which are captured by the hood and vented up the stack which is 10 inches in diameter.

The aspirating action developed by the discharge from the J tube creates a low pressure area at the entrance to the vent which may be so great that room air, too, is sucked up the stack, and on some occasions, snow is drawn up. This force can be modulated by adjustments to the damper shown at 18 in FIG. 1 or by regulating the location of the sleeve 38 shown in FIG. 2.

The "tee" 19 shown in FIG. 1 is located so that its centerline is 12 inches to 18 inches above the top of the hood. The hand damper 18 in the tee section should be set as nearly wide open as possible and still remove all $CO_2$ vapor coming out of the boxes. As this damper is closed the tendency to pull snow up the exhaust duct increases. The longer the exhaust duct, the more nearly closed this damper needs to be set so that adequate vapor exhaust is provided.

The blower 20 is driven to exhaust about 1,200 cubic feet per minute at one-half inch static pressure. The blower/motor may be mounted either inside or outside of the building but preferably, the vent should go out of the roof.

While there has been illustrated and described a single embodiment of the apparatus and method of the present invention, it will be apparent that various changes and modifications thereof will occur to those skilled in the art. It is intended in the following claims to cover all such changes and modifications as fall within the true spirit and scope of the present invention.

I claim:

1. Apparatus for generating carbon dioxide snow with a reduced carbon dioxide vapor content comprising a hood open on the bottom and having an enclosing side wall and top, upstanding vent means having its inlet in said top, a horn to convert liquid carbon dioxide into carbon dioxide snow and carbon dioxide vapor within the hood said horn being adjacent said vent, and jet means for directing a high velocity stream of carbon dioxide vapor up said vent at said inlet.

2. Apparatus according to claim 1 wherein the jet means comprises means to generate snow from liquid $CO_2$ and to separate the $CO_2$ vapor as a high velocity stream.

3. Apparatus according to claim 1 including a stack connected to said vent, suction means in said stack and damper means in said vent.

4. Apparatus according to claim 1 wherein the jet discharge is adjacent said inlet to said vent.

5. Apparatus according to claim 1 including a damper adjacent said inlet of said vent.

6. Apparatus according to claim 2 wherein the jet means comprises a bent tube wherein the snow and gas are separated by centrifugal force.

7. The method of converting liquid $CO_2$ into dry ice snow and disposing of the resulting $CO_2$ vapor comprising the steps of converting at a first location a stream of liquid $CO_2$ into dry ice snow having a low velocity, separating the snow from the vapor substantially by gravity, converting a second stream of liquid $CO_2$ into vapor and snow at a second location adjacent said first location, discharging the vapor from said second stream into a vent adjacent said first location at a velocity sufficient to aspirate the vapor from the first location into the vent.

8. Method according to claim 7 wherein the low velocity snow is delivered in a downward direction.

9. The method of claim 7 including the step of modulating the flow of $CO_2$ vapor through the vent by admitting air to the vent adjacent the discharge of vapor from said second location.

10. The method of claim 7 including the step of applying suction to a stack connected to said vent whereby discharge of vapor in the stack is continued upon interruption of vapor discharge from said second location.

* * * * *